United States Patent [19]
Jackson

[11] Patent Number: 5,415,353
[45] Date of Patent: May 16, 1995

[54] PRESS-FIT HANDLE ASSEMBLY

[75] Inventor: Gregory D. Jackson, Zeeland, Mich.

[73] Assignee: RL Corporation, Lowell, Mich.

[21] Appl. No.: 106,039

[22] Filed: Aug. 12, 1993

[51] Int. Cl.6 .................... F16L 13/007; F16L 33/00; B05B 9/01
[52] U.S. Cl. ..................... 239/530; 285/21; 285/239
[58] Field of Search ................. 239/525, 530, 373; 285/21, 239, 242, 253, 38, 381

[56]  References Cited
U.S. PATENT DOCUMENTS

| | | | |
|---|---|---|---|
| 691,651 | 1/1902 | Morrill | 239/530 |
| 708,537 | 9/1902 | Esch | 239/530 |
| 708,538 | 9/1902 | Esch | 239/530 |
| 2,015,923 | 10/1935 | Davis . | |
| 2,633,150 | 3/1953 | Lewis | 239/575 |
| 2,805,088 | 9/1957 | Cline et al. | 285/239 |
| 3,495,780 | 2/1970 | Rasmussen et al. | 239/530 |
| 3,799,447 | 3/1974 | Beal . | |
| 4,527,743 | 7/1985 | Ettlinger et al. | 239/530 |
| 4,930,664 | 6/1990 | Ellison | 239/352 |
| 5,064,170 | 11/1991 | Feyen | 251/344 |
| 5,072,884 | 12/1991 | Ellison et al. | 239/373 |

FOREIGN PATENT DOCUMENTS

| | | | |
|---|---|---|---|
| 644050 | 10/1928 | France . | |
| 2820261 | 11/1979 | Germany | 285/239 |
| 4-54397 | 2/1992 | Japan | 285/21 |
| 2133850 | 8/1984 | United Kingdom | 285/21 |

Primary Examiner—Karen B. Merritt
Attorney, Agent, or Firm—Price, Heneveld, Cooper, DeWitt & Litton

[57]  ABSTRACT

The specification discloses a lawn and garden sprayer in which the sprayer-valve assembly is joined to a rigid plastic handle by a threadless handle nut. The specification also discloses a method whereby the plastic handle, having an opening therein of slightly smaller dimensions than the handle nut, is ,joined to the handle nut by heating the plastic handle such that the handle nut can be forcibly inserted and intimately attached to the handle.

47 Claims, 2 Drawing Sheets

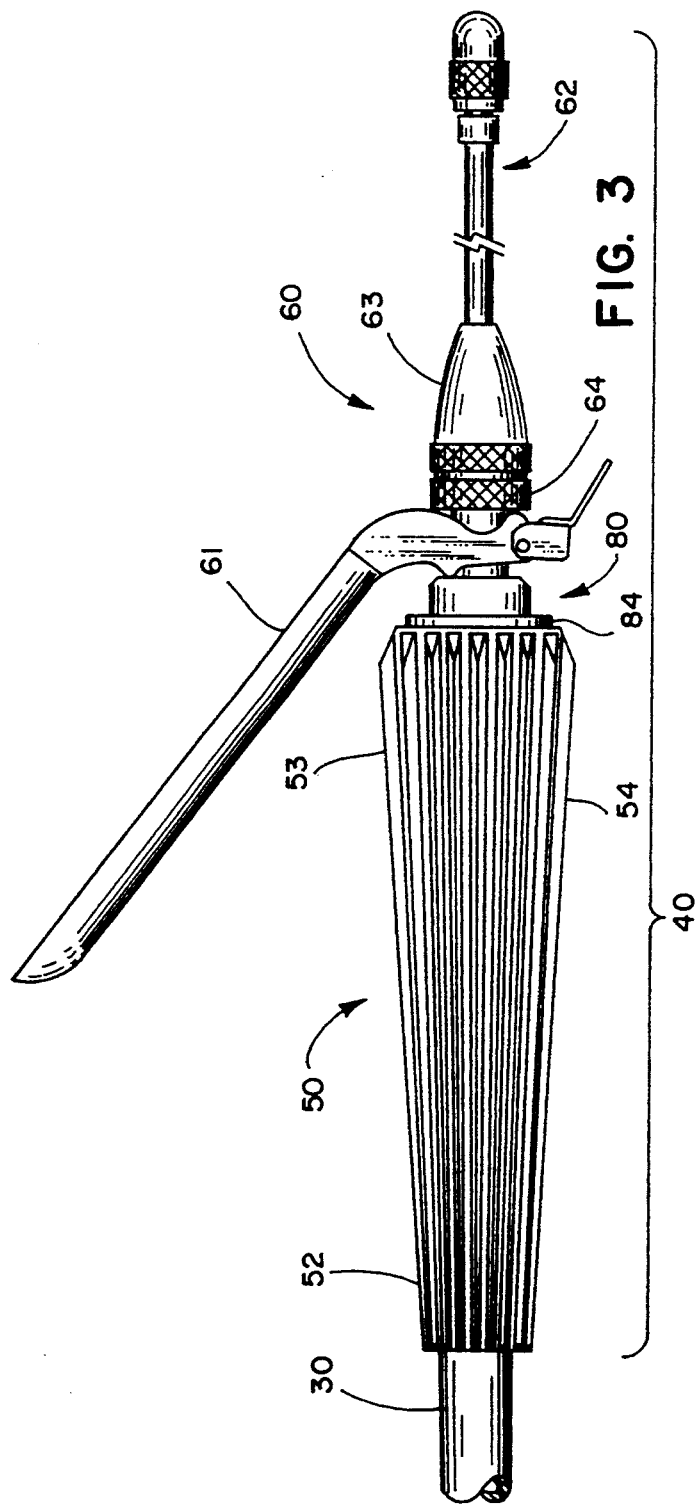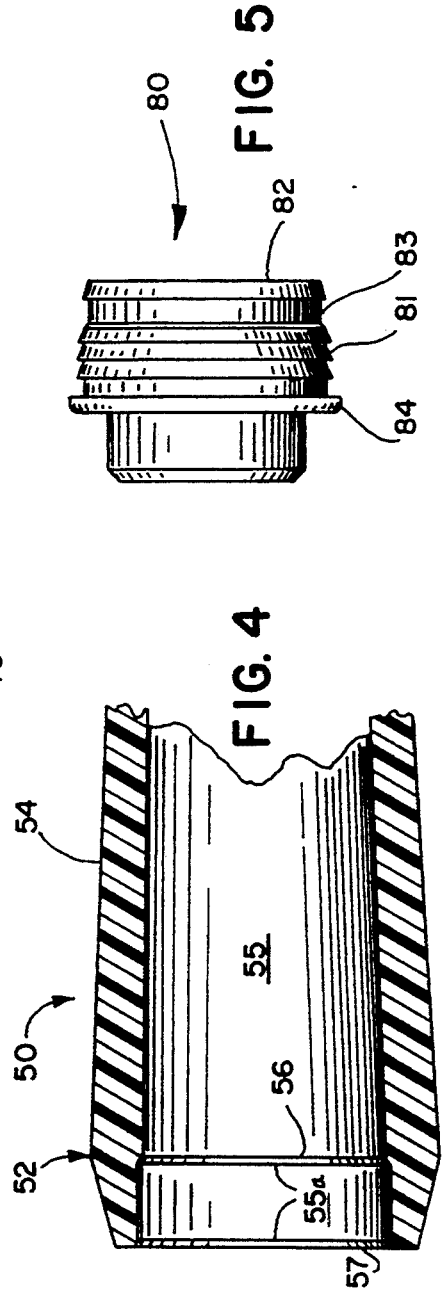

PRESS-FIT HANDLE ASSEMBLY

BACKGROUND OF THE INVENTION

The present invention relates to lawn and garden sprayers and, more particularly, to a handle assembly used in conjunction with the liquid-spraying end of such lawn and garden sprayers.

The typical lawn and garden sprayer includes a liquid-dispensing tank connected, by means of a length of flexible dispensing hose, to a spray-wand having a handle for secure gripping. Prior art spray-wand and handle assemblies include a grip or handle, a nozzle through which liquid is dispensed, a shut-off valve actuated by a canted lever, and a means for securing a liquid-dispensing hose to the sprayer body. In a typical sprayer, the flexible hose is connected to a tube projecting from a threaded coupler which is threaded into the mating thread in tile end of a sleeve-like hand grip. A valve assembly and spray-wand are connected to the output side of the coupler.

U.S. Pat. No. 708,537 discloses similar threaded means of attaching a grip to the nozzle portion of a sprayer assembly, but without a valve assembly. Patent '537 discloses a hose-enshrouding grip having an opening therethrough, one end of which is threaded to receive a coupling insert. The end of the coupling insert projecting away from tile grip has a similar threaded projection for receiving the likewise threaded end of a spray nozzle.

U.S. Pat. No. 708,538 discloses an almost identical grip, but for an annular retainer located at the coupler receiving end thereof. Rather than threading the grip onto the coupler, the annular retainer of the grip is folded over an annular collar on the coupler and thereby retains the coupler. As with '537, the coupling insert of '538 includes a threaded projection for receiving the spray nozzle portion. of the sprayer unit.

The threaded coupler method requires machining the handle so that the coupler can be threaded into place, thus increasing both the manufacturing expenses and the cost of the sprayer unit. The retainer method requires a manufacturing operation for folding the retainer over the coupler collar.

SUMMARY OF THE INVENTION

In the lawn and garden sprayer of the present invention, the hose coupler includes an annular ridge which is force-fit into a nonthreaded opening in a rigid, polymeric handle. In assembly, the polymeric handle is heated to a point of sufficient malleability to facilitate the force-fit assembly. The ridge "bites" into the polymeric handle such that, as it cools, the polymeric handle conforms to the shape of the ridge, insuring a secure fit.

BRIEF DESCRIPTION OF THE DRAWINGS

FIG. 3 illustrates an elevational view of the handle and sprayer nozzle unit, including the shut-off valve;

FIG. 4 is a lateral, cross-sectional view of the handle body alone; and

FIG. 5 shows an elevational view of the hose coupler of the present invention.

DESCRIPTION OF THE PREFERRED EMBODIMENT

Figure 1:
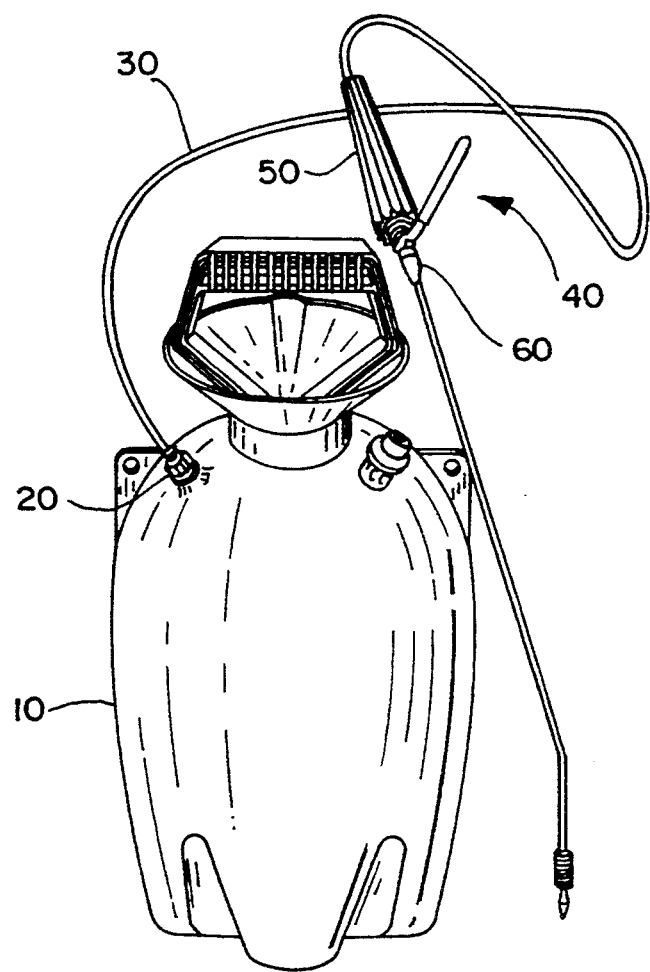
FIG. 1 is a perspective view of the lawn and garden sprayer including the handle assembly of the present invention.

In the preferred embodiment, the lawn and garden sprayer 1 (FIG. 1), comprises a liquid-dispensing tank 10 to which one end of a dispensing hose 30 is coupled via coupling projection 20, the other end of dispensing hose 30 being coupled to coupler 70° 80 of sprayer assembly 40. Coupler 70-80 comprises a coupler tube 70 which passes through and is secured to a nonthreaded handle nut 80. Hose 30 is fitted over one end of tube 70. Sprayer assembly 40 (FIGS. 2 and 3) includes a plastic handle 50 into which coupler 70-80 is force-fit and a spray-wand 60 is secured to the other end of tube 70.

Handle 50 (FIGS. 3 and 4) is comprised of a tapered sleeve-like handle body 51, having spaced enlarged and slender ends 53 and 52 respectively. The entire exterior surface of handle 50 includes longitudinal, parallel ribs 54, providing a gripping surface superior to the surface of dispensing hose 30 alone. Through the center of handle 50 runs a passageway 55 for receiving dispensing hose 30 through one end thereof and handle nut 80 of coupler 70-80 at the opposite end thereof. Towards the handle nut 80 receiving end of passageway 55 is annular rim 56, inclined outwardly at an angle of approximately 45°. At rim 56, passageway 55 increases in the diameter from a width of approximately 0.84 inches to a width of between 0.860 and 0.865 inches. This increased diameter portion 55a of passageway 55 extends for around .29 inches, terminating at a similar, outwardly sloping rim 57 which marks the endmost portion of handle 50.

In the preferred embodiment, handle 50 is molded from a rigid polymeric material, such as 10% glass-filled polypropylene, having a thermal deflection temperature of about 255° F. with a load of 264 psi. Such polypropylene is commercially available from Rhetech (G10P100).

Handle nut 80 (FIGS. 2 and 5), preferably constructed of brass or similar rust-resistant metal, includes a series of annular, barb-shaped ridges 81, a spaced, similarly barb-shaped ridge 82, an annular stop-shoulder 84, and a bore 85 running longitudinally through the center of handle nut 80. The outer diameter of each ridge 81 is 0.895 to 0.902 inches and the base diameter of each ridge 81 is about 0.860 inches. Ridge 82 on the other hand has an outer diameter of 0.860 inches, and space 83 has an outer diameter of approximately 0.840 inches and a length of about 0.09 inches.

Coupler tube 70 passes through and is secured in bore 85 such that portions of tube 70 extend from either side of handle nut 80. Tube 70 and handle nut 80 are securely bonded so they become essentially one functional unit. Hose end 73, over which dispensing hose 30 is fitted, includes a series of annular, barb-shaped ridges 71 which engages and hold dispensing-hose 30. Passageway 72, running longitudinally through the center of tube 70, provides a means of fluid communication between dispensing-hose 30 and the spray-wand portion 60 of sprayer assembly 40. As with handle nut 80, tube 70 is preferably constructed of brass or similar rust-resistant metal.

In the assembly of sprayer unit 40, flexible dispensing-hose 30 is fed through passageway 55 in handle 50, its end being forced over the barb-shaped ridges 71 of hose end 73 of connector tube 70. A metal crimp ring 90 (FIG. 2) is securely fastened over the exterior circumference of dispensing-hose 30 immediately adjacent to hose end 73. The combined action of barb-shaped ridges 71 and crimp ring 90 prevent dispensing-hose 30 from being easily pulled away front connector tube 70.

Handle 50 is heated to approximately 110° F., such that the polypropylene becomes slightly elastic, at which point the enlarged end 53 of handle 50 is forcibly pressed over the annular, barb-shaped ridges 81 and 82 of handle nut 80. Specifically, the modulus of elasticity drops from about 350,000 psi to about 110,000 psi when the plastic is heated to 110° F. The compression pressure for this procedure is preferably about 250 psi. Annular stop-shoulder 84 prevents handle 30 front being pushed too far forward during this procedure. As handle 50 cools, its polypropylene material hardens in accordance with the impressions made by barb-shaped ridges 81 and 82, such that handle 50 cannot be pulled away from handle nut 80.

To complete the sprayer assembly 40, the components related to spray-wand 60 are placed over or otherwise joined to that portion of tube 70 which projects out of handle nut 80 away from dispensing hose 30. These components include: a shut-off lever 61 pivotally seated over tube 70, extension wand tube 62, and an externally threaded nut 64 slidably received on tube 70. Housed beneath the base 63 of spray-nozzle extension wand 62, as is conventional, is an end cap (not shown) secured to the end of tube 70 and including fluid-flow openings therein which communicate with the interior of tube 70, a spring (not shown) which extends between nut 64 and the end cap on tube 70, and a rubber O-ring on the end cap (not shown). The base 63 of wand tube 62 is internally threaded, and is threaded onto externally threaded nut 64.

To start the flow of liquid to spray-nozzle extension 62, shut-off lever 61 is depressed towards the handle 50. Since handle nut 80 is immobile, actuating the shut-off lever 61 forces both spray-nozzle extension nut 64 and spray-wand 60 to slide forward on the projecting portion of tube 70 on which they rest. In sliding the base 63 of spray-wand tube 62 is unseated from the end cap on tube 70, allowing fluid to flow through the opening in said end cap and into spray-wand tube 62, as is known. To stop tile flow of liquid, shut-off lever 61 is released, such that the base 63 of spray-nozzle extension wand 62 returns to its "off" position, in which it rests tightly against the end cap on the tip of tube 70. The spring (not shown) in the base 63 of wand 60 provides the force to return wand 60 to its "off" position, while the likewise indicated O-ring (also not shown) insures a tight seal so that liquid is forced only into tube 62 of wand 60.

Figure 2:
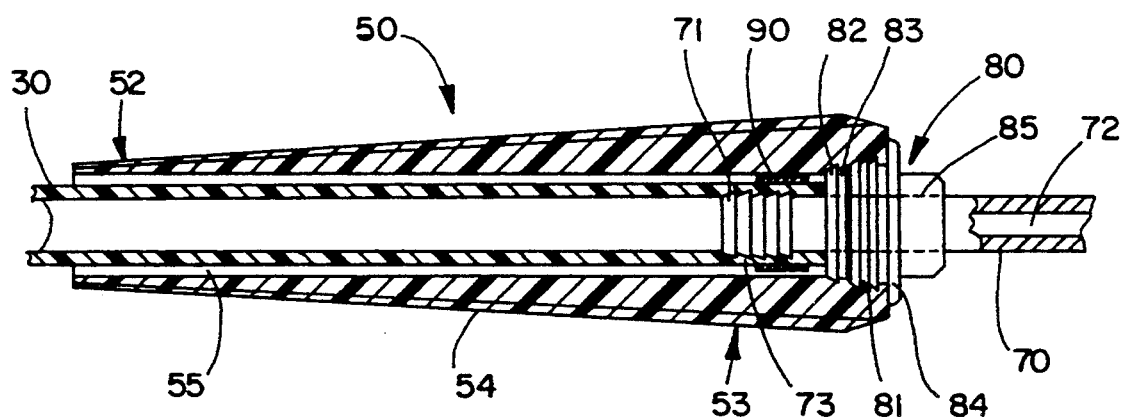
FIG. 2 shows a lateral, cross-sectional view of the handle assembly of the present invention.

In practice, frequent depression of the shut-off lever 61 tends to put pressure on both handle nut 80 and handle 50 such that the two components tend to cant relative to each other. Barb-like ridge 82 counters this so-called "tipping" force (FIGS. 2 and 5). By virtue of the space 83 between barb-like ridges 81 and ridge 82, the latter ridge provides an excellent anchor to prevent the canting of handle nut 80 relative to handle 50.

Of course, it is understood that the foregoing is merely a preferred embodiment of the invention. Various other changes and alterations, apparent to those skilled in the art, can be made without departing from the spirit and broader aspects thereof as set forth in tile appended claims, interpreted in accordance with the principles of patent law.

The embodiments of the invention in which an exclusive property or privilege is claimed are defined as follows:

1. A lawn and garden sprayer comprising:
   a liquid-dispensing tank for holding the desired liquid to be applied;
   a dispensing hose extending from said tank such that fluid communication is possible between said hose and said tank, to a coupler to which said hose is connected;
   said coupler including at least one annular projecting ridge and having an annular stop-shoulder located on one side of said at least one annular projecting ridge and being larger in diameter than said at least one annular projecting ridge;
   a rigid plastic handle, including at least one nonthreaded opening therein for receiving said coupler, said opening in said handle being smaller in diameter than the outside diameter of said at least one annular projecting ridge, said coupler, including said at least one annular projecting ridge, being force-fit into said opening whereby said at least one annular projecting ridge is embedded in the plastic material circumscribing said nonthreaded opening; and
   said stop-shoulder limits the extent to which said coupler fits into said nonthreaded opening.

2. The lawn and garden sprayer of claim 1, wherein said plastic handle is made of glass reinforced polypropylene, having a thermal deflection temperature of 255° F. with a load of 264 psi.

3. The lawn and garden sprayer of claim 1, wherein said at least one annular projecting ridge comprises a barb-like configuration.

4. A lawn and garden sprayer comprising:
   a liquid-dispensing tank for holding the desired liquid to be applied;
   a dispensing hose extending from said tank such that fluid communication is possible between said hose and said tank;
   a rigid plastic handle made of glass-reinforced polypropylene, having a thermal deflection temperature of 255° F. with a load of 264 psi, and having at least one nonthreaded opening therein;
   a coupler connected to one end of said hose, external said tank, and disposed in said nonthreaded opening in said rigid plastic handle, said coupler including at least one annular projecting ridge force-fit into said opening whereby said at least one annular projecting ridge is embedded in the plastic material circumscribing said opening;
   said coupler including an annular stop-shoulder, located behind said at least one annular projecting ridge and being larger in diameter than said at least one annular projecting ridge such that said stop-shoulder limits the extent to which said coupler can be inserted into said nonthreaded opening in said handle.

5. The lawn and garden sprayer of claim 4, wherein said at least one annular projecting ridge comprises a barb-like configuration.

6. The lawn and garden sprayer of claim 5, wherein said barb-like ridge includes a leading surface sloping in the direction of insertion of said coupler into said opening in said handle to facilitate insertion, and a rear surface which is at least vertical to resist withdrawal of said coupler from said handle.

7. The lawn and garden sprayer of claim 6, wherein said at least one annular projecting ridge comprises a plurality of barb-like ridges and wherein each said barb-like ridge includes a leading surface sloping in the direction of insertion of said coupler into said nonthreaded opening in said handle to facilitate insertion, and a rear surface which is at least vertical to resist withdrawal of said coupler from said handle.

8. The lawn and garden sprayer of claim 7, in which said handle is sleeve-like in configuration, including an inner passageway extending from one end thereof to the other; said dispensing hose extending substantially through said inner passageway and terminating proximate said nonthreaded opening for receiving said coupler.

9. The lawn and garden sprayer of claim 8, in which a portion of said coupler projects from said plastic handle, and a spray-wand assembly is secured to said projecting portion of said coupler.

10. The lawn and garden sprayer of claim 9, wherein said coupler comprises a handle nut including a tube running therethrough, one end of said tube being connected to said dispensing hose, the other end of said tube being connected to said spray-wand assembly, said at least one annular projecting ridge being located on said handle nut.

11. The lawn and garden sprayer of claim 10, which said stop-shoulder is also located on said handle nut.

12. The lawn and garden sprayer of claim 11, wherein said coupler includes three adjacent barb-like ridges and a spaced, fourth barb-like-ridge.

13. The lawn and garden sprayer of claim 4, in which a portion of said coupler projects from said plastic handle, and a spray-wand assembly is secured to said projecting portion of said coupler.

14. The lawn and garden sprayer of claim 13, wherein said coupler comprises a handle nut including a tube running therethrough, one end of said tube being connected to said dispensing hose, the other end of said tube being connected to said spray-wand assembly, said at least one annular projecting ridge .being located on said handle nut.

15. The lawn and garden sprayer of claim 14, in which said handle is sleeve-like in configuration, including an inner passageway extending from one end thereof to the other; said dispensing hose extending substantially through said inner passageway terminating proximate said nonthreaded opening for receiving said coupler.

16. The lawn and garden sprayer of claim 14, wherein said at least one annular projecting ridge includes three adjacent barb-like ridges and a spaced, fourth barb-like ridge.

17. The lawn and garden sprayer of claim 16, wherein said at least one annular projecting ridge comprises a plurality of barb-like ridges and wherein each said barb-like ridge includes a leading surface sloping in the direction of insertion of said coupler into said opening in said handle to facilitate insertion, and a rear surface which is at least vertical to resist withdrawal of said coupler from said handle.

18. A lawn and garden sprayer comprising:
a liquid-dispensing tank for holding the desired liquid to be applied;
a dispensing hose extending from said tank such that fluid communication is possible between said hose and said tank;
a rigid plastic handle made of glass-reinforced polypropylene, having a thermal deflection temperature of 255° F. with a load of 264 psi, and having at least one nonthreaded opening therein;
a coupler connected to one end of said hose, external said tank, and disposed in said nonthreaded opening in said rigid plastic handle, said coupler including at least one annular projecting ridge force-fit into said opening whereby said at least one annular projecting ridge is embedded in the plastic material circumscribing said opening;
said at least one annular projecting ridge comprises a barb-like configuration including a leading surface sloping in the direction of insertion of said coupler into said opening in said handle to facilitate insertion, and a rear surface which is at least vertical to resist withdrawal of said coupler from said handle.

19. The lawn and garden sprayer of claim 18, wherein said at least one annular projecting ridge includes three adjacent barb-like ridges and a spaced, fourth barb-like ridge.

20. The lawn and garden sprayer of claim 19, wherein said at least one annular projecting ridge comprises a plurality of barb-like ridges and wherein each said barb-like ridge includes a leading surface sloping in the direction of insertion of said coupler into said opening in said handle to facilitate insertion, and a rear surface which is at least vertical to resist withdrawal of said coupler from said handle.

21. A lawn and garden sprayer comprising:
a liquid-dispensing tank for holding the desired liquid to be applied;
a dispensing hose extending from said tank such that fluid communication is possible between said hose and said tank;
a rigid plastic handle made of glass-reinforced polypropylene, having a thermal deflection temperature of 255° F. with a load of 264 psi, and having at least one nonthreaded opening therein;
a coupler connected to one end of said hose, external said tank, and disposed in said nonthreaded opening in said rigid plastic handle, said coupler including at least one annular projecting ridge having a barb-like configuration force-fit into said opening whereby said at least one annular projecting ridge is embedded in the plastic material circumscribing said opening;
said handle is sleeve-like in configuration, including an inner passageway extending from one end thereof to the other; said dispensing hose extending substantially through said inner passageway and terminating proximate said nonthreaded opening for receiving said coupler.

22. The lawn and garden sprayer of claim 21, in which a portion of said coupler projects from said plastic handle, and a spray-wand assembly is secured to said projecting portion of said coupler.

23. The lawn and garden sprayer of claim 22, wherein said coupler comprises a handle nut including a tube running therethrough, one end of said tube being connected to said dispensing hose, the other end of said tube being connected to said spray-wand assembly, said at least one annular projecting ridge being located on said handle nut.

24. The lawn and garden sprayer of claim 23, wherein said handle nut also includes a stop-shoulder.

25. A lawn and garden sprayer comprising:
a liquid-dispensing tank for holding the desired liquid to be applied;
a dispensing hose extending from said tank-such that fluid communication is possible between said hose and said tank;

a coupler connected to an end of said hose, external said tank, said coupler including at least one annular projecting ridge;

a rigid plastic handle, including at least one non-threaded opening therein for receiving said coupler, said opening in said handle being smaller in diameter than the outside diameter of said at least one annular projecting ridge, said coupler, including said at least one annular projecting ridge, force-fit into said opening whereby said at least one annular projecting ridge is embedded in the plastic material circumscribing said opening; and a portion of said coupler projects from said plastic handle, and a spray-wand assembly is secured to said projecting portion of said coupler.

26. A method of joining a lawn and garden sprayer hose coupled to a handle comprising:

providing the hose coupler with at least one annular projecting ridge;

providing a rigid plastic handle having a nonthreaded opening in at least one end thereof for receiving said coupler, said opening and the coupler being so dimensioned relative to one another that the coupler will not fit into said opening Without the application of force;

heating said plastic handle to render the plastic material thereof impressionable; and forcing the coupler, including said at least one annular projecting ridge, into said handle opening, whereby said at least one annular projecting ridge becomes embedded in the plastic material circumscribing said handle opening to thereby help hold the coupler in place within said handle opening.

27. The method of claim 26, wherein said plastic handle is heated to approximately 110° to 120° F.

28. The method of claim 27, wherein the coupler, including said at least one annular projecting ridge, is forced into said heated plastic handle with approximately 250 psi of pressure.

29. The method of claim 28, which includes configuring said at least one annular projecting ridge in a barb-like configuration, with a leading surface sloping in the direction of insertion of the coupler into said opening and said handle to facilitate said insertion, and a rear surface which is at least vertical to resist withdrawal of the coupler from said handle.

30. The method of claim 29, which includes providing said at least one annular projecting ridge with three adjacent barb-like ridges and a spaced fourth, barb-like ridge.

31. The method of claim 30, which includes providing an annular stop-shoulder on the coupler, behind said at least one annular projecting ridge, which is larger in diameter than said at least one annular projecting ridge to limit the extent to which the coupler can be inserted into said nonthreaded opening in said handle.

32. The method of claim 31, which includes leaving a portion of the coupler projecting frown said handle and securing a sprayer wand assembly to said projecting portion of said coupler.

33. The method of claim 32, which includes providing said rigid plastic handle with a sleeve-like in configuration, having a passageway extending from one end thereof to the other, said nonthreaded opening in said handle comprising one end of said passageway; and passing said dispensing hose through said passageway in said handle and securing it to the coupler prior to forcing the coupler, including said annular projecting ridge, into said handle opening.

34. The method of claim 33, which includes making said plastic handle of glass reinforced polypropylene, having a thermal deflection temperature of 225° F. with a load of 264 psi.

35. The method of claim 28, which includes providing an annular stop-shoulder on the coupler, behind said at least one annular projecting ridge, which is larger in diameter than said at least one annular projecting ridge to limit the extent to which the coupler can be inserted into said nonthreaded opening in said handle.

36. The method of claim 35, which includes leaving a portion of said coupler projecting from said handle and securing a sprayer wand assembly to said projecting portion of said coupler.

37. The method of claim 35, which includes providing said rigid plastic handle with a sleeve-like configuration, having a passageway extending from one end thereof to the other, said nonthreaded opening in said handle comprising one end of said passageway; and passing said dispensing hose through said passageway in said handle and securing it to the coupler prior to forcing the coupler, including said at least one annular projecting ridge, into said handle opening.

38. The method of claim 26, which includes providing an annular stop-shoulder on the coupler, behind said at least one annular projecting ridge, which is larger in diameter than said at least one annular projecting ridge to limit the extent to which the coupler can be inserted into said nonthreaded opening in said handle.

39. The method of claim 32, which includes leaving a portion of the coupler projecting from said handle and securing a sprayer wand assembly to said projecting portion of said coupler.

40. The method of claim 39, which includes providing said rigid plastic handle with a sleeve-like configuration, having a passageway extending from one end thereof to the other, said nonthreaded opening in said handle comprising one end of said passageway; and passing said dispensing hose through said passageway in said handle and securing it to the coupler prior to forcing the coupler, including said at least one annular projecting ridge into said handle opening.

41. The method of claim 26, wherein said coupler, including said at least one annular projecting ridge, is forced into said heated plastic handle with approximately 250 psi of pressure.

42. The method of claim 41, which includes configuring said at least one annular projecting ridge in a barb-like configuration, with a leading surface sloping in the direction of insertion of the coupler into said opening and said handle to facilitate said insertion, and a rear surface which is at least vertical to resist withdrawal of the coupler from said handle.

43. The method of claim 42, which includes providing said at least one annular projecting ridge with three adjacent barb-like ridges and a spaced fourth, barb-like ridge.

44. The method of claim 41, which includes providing an annular stop-shoulder on the coupler, behind said at least one annular projecting ridge, which is larger in diameter than said at least one annular projecting ridge to limit the extent to which the coupler can be inserted into said nonthreaded opening in said handle.

45. The method of claim 44, which includes providing said rigid plastic handle with a sleeve-like configuration, having a passageway extending from one end thereof to the other, said nonthreaded opening in said handle comprising one end of said passageway; and passing said dispensing hose through said passageway in said handle and securing it to the coupler prior to forcing the coupler, including said at least one annular projecting ridge, into said handle opening.

46. The method of claim 26, which includes providing said rigid plastic handle with a sleeve-like configuration, having a passageway extending from one end thereof to the other, said nonthreaded opening in said handle comprising one end of said passageway; and passing said dispensing hose through said passageway in said handle and securing it to the coupler prior to forcing the coupler, including said at least one annular projecting ridge, into said handle opening.

47. A lawn and garden sprayer comprising:

a liquid-dispensing tank for holding the desired liquid to be applied;

a dispensing hose extending from said tank such that fluid communication is possible between said hose and said tank, to a coupler to which said hose is connected;

said coupler including at least one annular projecting ridge having a barb-like configuration; and a rigid plastic handle, including at least one nonthreaded opening therein for receiving said coupler, said opening in said handle being smaller in diameter than the outside diameter of said at least one annular projecting ridge, said coupler including said at least one annular projecting ridge, being force-fit into said opening whereby said at least one annular projecting ridge is embedded in the plastic material circumscribing said nonthreaded opening.

* * * * *

UNITED STATES PATENT AND TRADEMARK OFFICE
CERTIFICATE OF CORRECTION

PATENT NO. : 5,415,353  
DATED : May 16, 1995  
INVENTOR(S) : Gregory D. Jackson Page 1 of 3

It is certified that error appears in the above-identified patent and that said Letters Patent is hereby corrected as shown below:

In the Abstract, line 6:

After "nut is" delete –,–.

Column 1, line 19:

"tile end" should be –the end–.

Column 1, line 28:

"tile grip" should be –the grip–.

Column 1, line 38:

After "portion" delete –.–.

Column 2, line 8:

"70° 80" should be –70-80–.

Column 3, line 2:

"front" should be –from–.

Column 3, line 11:

"front" should be –from–.

Column 3, line 42:

"tile flow" should be –the flow–.

UNITED STATES PATENT AND TRADEMARK OFFICE
CERTIFICATE OF CORRECTION

PATENT NO. : 5,415,353
DATED : May 16, 1995
INVENTOR(S) : Gregory D. Jackson

It is certified that error appears in the above-indentified patent and that said Letters Patent is hereby corrected as shown below:

Column 3, line 62:

"in tile" should be --in the--.

Column 5, line 36, Claim 14:

After "ridge" delete --.--.

Column 7, line 24, Claim 26:

"Without" should be --without--.

Column 7, line 59, Claim 32:

"frown" should be --from--.

Column 7, line 61, Claim 32:

"said" should be --the--.

Column 8, line 14, Claim 36:

"said" should be --the--.

Column 8, line 16, Claim 36:

"said" should be --the--.

Column 8, line 17, Claim 37:

"claim 35" should be --claim 36--.

UNITED STATES PATENT AND TRADEMARK OFFICE
CERTIFICATE OF CORRECTION

PATENT NO. : 5,415,353
DATED : May 16, 1995
INVENTOR(S) : Gregory D. Jackson

It is certified that error appears in the above-identified patent and that said Letters Patent is hereby corrected as shown below:

Column 8, line 32, Claim 39:

"claim 32 should be --claim 38--.

Column 8, line 35, Claim 39:

"said" should be --the--.

Signed and Sealed this

Twenty-eighth Day of October, 1997

Attest:

BRUCE LEHMAN

Attesting Officer

Commissioner of Patents and Trademarks